United States Patent [19]
Warren

[11] Patent Number: 5,526,171
[45] Date of Patent: Jun. 11, 1996

[54] LASER PULSE SHAPER

[75] Inventor: Warren S. Warren, Lawrenceville, N.J.

[73] Assignee: The Trustees of Princeton University, Princeton, N.J.

[21] Appl. No.: 374,260

[22] Filed: Jan. 18, 1995

[51] Int. Cl.[6] .................................................. G02F 1/11
[52] U.S. Cl. ..................... 359/285; 359/245; 359/254; 359/264; 359/316
[58] Field of Search ........................... 359/285, 287, 359/245, 254, 262, 263, 264, 276, 305, 316, 317, 359, 572, 39

[56] References Cited

U.S. PATENT DOCUMENTS

| | | | |
|---|---|---|---|
| 3,258,596 | 6/1966 | Green | 359/264 |
| 3,961,841 | 6/1976 | Giordmaine | 359/264 |
| 4,403,833 | 9/1983 | Kenan et al. | 359/316 |
| 4,415,226 | 11/1983 | Verber et al. | 359/245 |
| 4,561,728 | 12/1985 | Kenan et al. | 359/276 |
| 4,613,204 | 9/1986 | Verber et al. | 359/245 |
| 4,889,415 | 12/1989 | Umezu | 359/285 |
| 5,120,961 | 6/1992 | Levin et al. | 359/285 |
| 5,311,351 | 5/1994 | Chesnoy | 359/264 |
| 5,414,540 | 5/1995 | Patel et al. | 359/39 |

OTHER PUBLICATIONS

C. W. Hillegas, J. X. Tull, D. Goswami, D. Strickland, and W. S. Warren; *Femtosecond laser pulse shaping by use of microsecond radio–frequency pulses;* OPTICS LETTERS, vol. 19, No. 10; May 15, 1994.

*Primary Examiner*—Loha Ben
*Attorney, Agent, or Firm*—Watov & Kipnes

[57] ABSTRACT

The frequency components of an input pulse are dispersed into divergent respective rays that are applied to an acousto-optic modulator after being collimated. The amplitude of each frequency component emerging from the modulator is determined by the amplitude and phase of a grating formed therein by modulated radio frequency wave applied to it. The parallel rays emerging from the modulator are focussed onto a device for forming an output pulse.

12 Claims, 2 Drawing Sheets

LASER PULSE SHAPER

BACKGROUND OF THE INVENTION

Ultrafast laser pulses have been shaped so as to alter the relative amounts of the various frequency components or colors of light therein. The best previously known apparatus for doing this includes means for dispersing the frequency components of incident laser pulses that are directed along an input path, passing these components through a collimator, positioning a multielement liquid crystal modulator, LCM, in the path of the light emerging from the collimator, collecting the collimated frequency components after they have passed through the LCM, and directing pulses from the focused frequency components along an output path that is collinear with the input path. Each of the liquid crystal elements is in a different position of the spectrum of dispersed light so that it can control the amount of light in that position. In this apparatus, a first diffraction grating is used to spatially disperse the frequency components of the incident pulses, and a collimating lens is placed between the first diffraction grating and the multielement LCM. A lens focusses the collimated light emerging from the LCM onto a second grating that directs emergent laser pulses having a different shape than the incident pulses along an output path.

Among the disadvantages of the pulse shaper or modulator just described are the difficulty of modulator alignment, the existence of pixel gaps between the elements of the liquid crystal, the need for pixel calibration and on/off isolation of pixels. As a result, the apparatus is restricted to discrete approximations of the desired spectrum.

As an illustration, consider a simple linearly frequency-swept (chirped) pulse. The Fourier transform of such a pulse has phase shifts proportional to $\omega^2$, so even a moderate sweep will require large phase shifts. Of course, the phase need only be reproduced modulo $2\pi$ at each pixel, so the control voltage need not be larger than the full-wave voltage of the modulator. However, LCM's generate a discrete and discontinuous approximation to a parabolic function, which will preclude complex frequency modulation, unless the phase increment between adjacent pixels is less than $2\pi$. This severely restricts the amount of chirp that can be imposed. In fact, some of the interesting potential applications of shaped pulses require much more sophisticated frequency modulation (for example, smoothly sweeping to resonance with a bright state and then holding the frequency and amplitude fixed), and here the limitations will be even more severe.

The uses of such a modulator are limited because of the inherently slow response of liquid crystals to an applied stimulation. Furthermore, each crystal element has to be separately modulated, thereby requiring a parallel drive, and independent amplitude and phase modulation cannot be achieved with one modulator.

BRIEF SUMMARY OF THE INVENTION

In this invention the frequency components or colors of incident laser pulses passing along an input path are spatially dispersed into respective divergent rays that are then collimated before impinging on the crystal of an acousto-optic modulator, AOM, at the Bragg angle. Modulated radio frequency waves applied to the crystal cause acoustic waves to move along it that produce corresponding changes in its index of refraction. The incident pulse is so short, e.g. a hundred femtoseconds, as to completely pass through the crystal before there is any significant propagation of the acoustic wave therein. Thus the changes in index of refraction resulting from the acoustic wave act like a modulated diffraction grating. The modulated parallel rays emerge from the crystal at the Bragg angle with an intensity determined by the phase and amplitude of the change in index of refraction through which they have passed. These rays are then focussed on a means for forming emergent pulses that differs from the incident pulses in a manner determined by the modulation. The emergent pulses are directed along an output path.

Various aspects of the present invention are also described in a paper by C. W. Hillegas, J. X. Tull, D. Goswami, D. Strickland, and W. S. Warren, entitled "Femtosecond laser pulse shaping by use of microsecond radio-frequency pulses", published on May 15, 1994, in OPTICS LETTERS, Vol. 19, No. 10, pages 737–739. The teachings of this paper are incorporated herein by reference to the extent they do not conflict herewith.

DETAILED DESCRIPTION OF THE INVENTION

Figure 1:
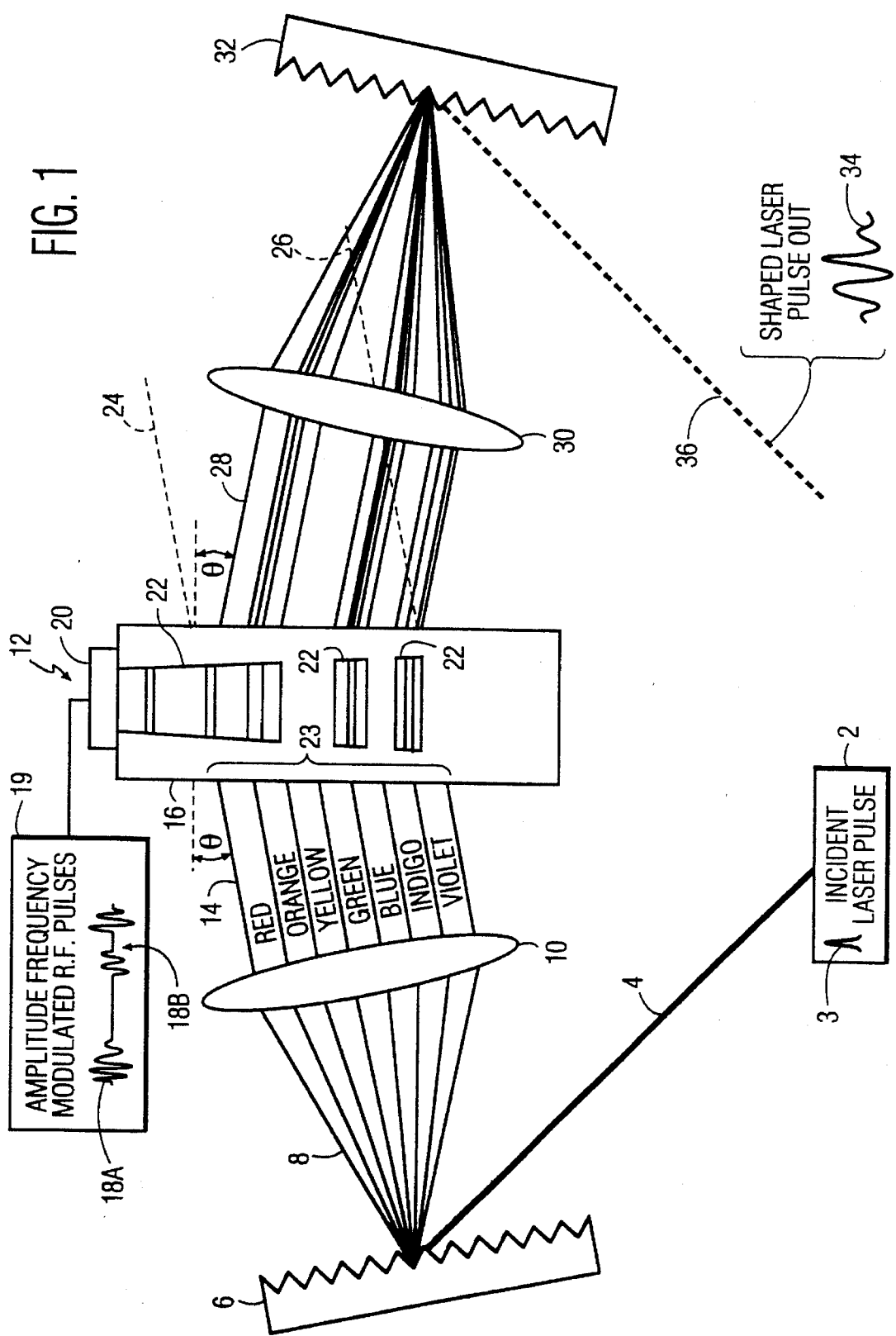
FIG. 1 shows pulse shaping apparatus for one embodiment of the invention.

In the drawing, a source 2 provides incident laser pulses like a pulse 3 of short duration along an input path 4 to a means, herein shown as a reflective grating 6, for spatially dispersing the frequency components, i.e. the colors therein, along rays on respective divergent paths indicated at 8. A collimating means, herein shown as being a lens 10, is mounted between the grating 6 and an acousto-optic modulator, AOM, 12 that is oriented so that the parallel rays 14 emerging from the lens 10 approach the crystal 16 of the AOM 12 at Bragg's angle $\Theta$. Although the crystal 16 can be made of any acousto-optic material, $TeO_2$ is preferred, in which case Bragg's angle is $\approx 20$ mrad, which is much smaller than the angle $\Theta$ shown in the drawing.

Note that in FIG. 1 the input rays 14 are shown for purposes of illustration as a full rainbow spectrum. At present, however, laser technology does not provide a laser beam that has the full rainbow spectrum, so that the rays 14 may be limited to a plurality of shades of a few contiguous colors or frequency components which need not be of visible light.

Pulses of frequency and/or amplitude modulated radio frequency waves such as illustrated at 18A and 18B, respectively, are provided by a source 19 and applied to a transducer 20 that is attached to the crystal 16 of the AOM 12 so as to cause corresponding acoustic waves 22 to move through the crystal 16 in a direction transverse to the collimated rays 14 at a speed of about 4.2 mm/µs (millimeters per microsecond). The acoustic waves cause corresponding changes in the index of refraction of the crystal 16 so as to form a moving grating. When laser source 2 generates a laser pulse 3, the grating 6 must be positioned relative to the aperture 23 to which the parallel rays 14 are applied so that the diffractions of the grating 6 intended for the respective rays 8 intercept those rays. The transit time of an incident laser pulse 3 through the crystal 16 is far too short for significant acoustic propagation so that the grating formed by acoustic waves 22 appears to be still.

If a continuous unmodulated radio frequency wave (rf) is applied to a transducer 20, all the rays 14 are deflected to the same degree by the acoustic waves 22 so that no pulse shaping occurs. Regardless as to whether an unmodulated rf wave or a modulated rf wave is applied to transducer 20 some small portion of the rays 14 will not be deflected, and will lie between dashed lines 24 and 26. Also, the rays 14 will pass undeflected through the crystal 16 in areas of the crystal not containing an acoustic wave 22 at the time, with the undeflected rays 14 exiting from the crystal 16 and lying between dashed lines 24 and 26. When, however, the radio frequency wave is either amplitude (18B) or frequency (18A) modulated, portions of the light in the respective rays 14 are diffracted along paths 28 that are at Bragg's angle θ with the crystal 16 as indicated. The diffraction efficiency and phase shift for each ray is determined by the amplitude and phase of the grating that it encounters.

The parallel rays in the paths 28 are focussed by means, herein indicated as being a lens 30, on a means, herein shown as being a reflective grating 32, for combining the rays so as to form emergent shaped laser pulses 34 traveling along an output path 36. Thus the amplitude or frequency modulation of the acoustic wave in the crystal 16 completely controls the shape of the output pulses 34.

It is suggested for one embodiment of the invention that the radio frequency carrier be 200 MHz, and that the modulation thereof have a bandwidth of 50 MHz.

Observation of FIG. 1 shows that the red light transverses a longer path in the apparatus than light of shorter wavelength such as violet and it is known that the index of refraction of the crystal 16 varies with color. Furthermore, by definition, the colors have different Bragg angles.

Figure 2:
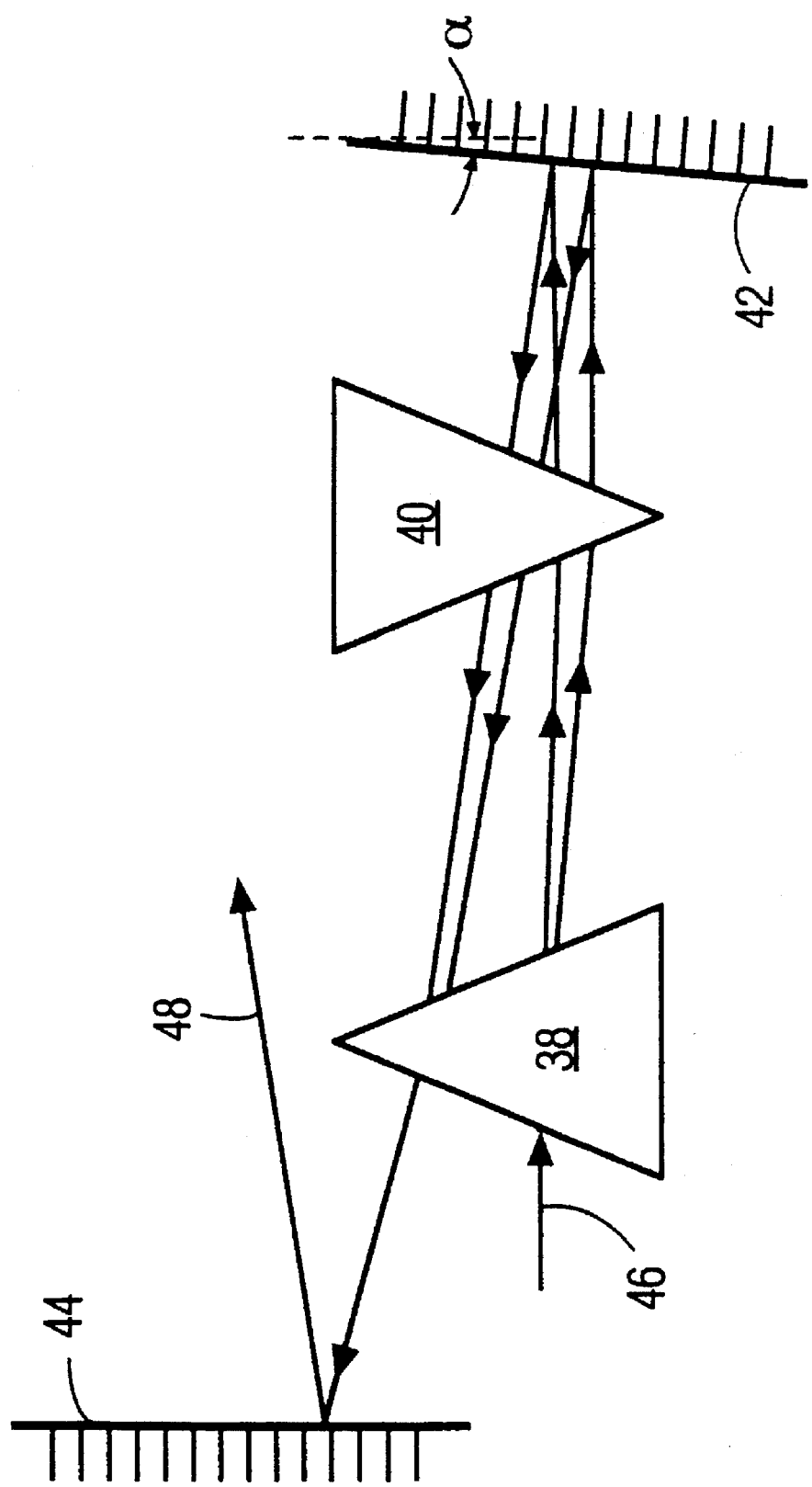
FIG. 2 shows one way of compensating for the fact that light of different colors travels through different path lengths, differences in the index of refraction for different colors, and differences in the Bragg angle for different colors.

Compensation for the frequency modulation created by the difference is path lengths in the apparatus, by the variation in index of refraction with wavelength, and by the variation of Bragg angle with wavelength can be provided by a variety of known methods. This compensation can be provided at the very beginning along light path 4 or at the very end along light path 36 of the apparatus. (In addition, it is possible to dramatically reduce these effects by simply changing the shape of the radio frequency pulse 18A and/or 18B.) FIG. 2, illustrates, for example, a well known dispersion compensator comprised of two prisms 38 and 40 that are pointed in opposite directions with their main axes parallel, a first mirror 42 to the right of the prism 40 that is tilted at an angle α (typically α=1°) to make the rays emerge above the incident plane, and a second mirror 44 to the left of the prism 38. The vertical axes of mirror 44, prism 38, and prism 40 are typically in parallel with one another. The apparatus can be oriented in FIG. 1 so that its input light path 46 is aligned with either of the laser beam paths 4 or 36. As shown in FIG. 2, compensation is provided by the input light beam entering prism 38 along path 46, exiting therefrom in a diverging manner relative to the different wavelengths of light, which then travel through prism 40 and exit in parallel, reflect off of mirror 42 at an angle, re-enter prism 40 in parallel, exit prism 40 in a converging manner, re-enter prism 38, and exit therefrom and reflect off of mirror 44 as an output beam 48. The output beam 48 would then represent a compensated laser pulse 3, or compensated shaped output laser pulse 36. Other dispersion compensation means could be used.

Compensation could also be made by sweeping the frequency of the r.f. waves of the pulses 18 supplied by the source 19.

In an embodiment of the invention, the AOM 12 was a $TeO_2$ (Crystal Technology 3200-121, orientated at the Bragg angle). The laser pulses had a 180-fs autocorrelation at 620 nm from a colliding-pulse mode locking laser, and the diffraction gratings 6 and 32 were 10 cm spherical lenses. Each color component was focussed in the AOM 12 to an effective spot size of approximately 20 um. The rf pulses 19 were synchronized to the output of the colliding-pulse mode-locking laser by mixing the output of a Le Croy 9100 arbitrary function generator with a 200 MHz signal and amplifying to a peak power of 0.5 W, thus producing a diffraction efficiency of approximately 50%.

Alternative structures will be apparent to those skilled in the art such as one or both of the gratings 6 and 32 being transmissive or using a mirror in place of either or both of the lenses 10 and 30. A prism or other dispersing element such as a confocal interferometer can be substituted for the grating 6 or for the grating 32.

Although various embodiments of the invention are shown and described herein, those of ordinary skill in the art may recognize certain modifications thereto. Such modifications are meant to be covered by the spirit and scope of the appended claims. For example, the AOM 12 can be inverted in FIG. 1 with all other components remaining as shown.

What is claimed is:

1. Pulse shaping apparatus, comprising:

a source of input laser pulses;

means for spatially dispersing frequency components of each of said pulses;

means for collimating the dispersed frequency components to produce collimated frequency components;

an acousto-optic modulator (AOM) positioned in the paths of the collimated frequency components;

means including a transducer for applying modulated radio frequency voltage waves to said acousto-optic modulator;

means for focussing the collimated frequency components after they have passed through the acousto-optic modulator; and means for forming shaped pulses of light from the focussed collimated frequency components.

2. Pulse shaping apparatus as set forth in claim 1, wherein said acousto-optic modulator is positioned so as to intercept the dispersed frequency components at Bragg's angle.

3. Apparatus as set forth in claim 1, wherein:

said means for spatially dispersing the frequency components of said pulses is a grating.

4. Apparatus as set forth in claim 1, wherein:

said means for forming pulses of light from the focussed collimated frequency components is a grating.

5. Apparatus as set forth in claim 1, wherein:

said means for collimating the dispersed frequency components is a lens.

6. Pulse shaping apparatus as set forth in claim 1, wherein said means for applying modulated radio frequency voltage waves to said acousto-optic modulator provides radio frequency waves that are modulated so as to produce pulses.

7. Pulse shaping apparatus as set forth in claim 1, wherein said means for applying modulated radio frequency voltage waves to said acousto-optic modulator provides radio frequency waves that are modulated so as to produce amplitude modulated pulses.

8. Pulse shaping apparatus as set forth in claim 1, wherein said means for applying modulated radio frequency voltage waves to said acousto-optic modulator provides radio frequency waves that are modulated so as to produce frequency modulated pulses.

9. Pulse shaping apparatus as set forth in claim 1, wherein said means for applying modulated radio frequency voltage waves to said acousto-optic modulator provides radio frequency waves that are modulated so as to produce simultaneously amplitude and frequency modulated pulses.

10. Pulse shaping apparatus as set forth in claim 1, wherein:

said acousto-optic modulator includes at one end means responsive to the application of modulated radio frequency waves for producing corresponding acoustic waves that pass through said modulator so as to form a moving grating;

said input laser pulses being of such short duration relative to the speed of said acoustic waves, that said grating moves an insignificant amount during the passage of said laser pulses through said AOM; and the period between said laser pulses is such as to permit said grating to move through all of the collimated dispersed frequency components.

11. Pulse shaping apparatus as set forth in claim 1, wherein:

said acousto-optic modulator includes means responsive to the application of modulated radio frequency waves for producing corresponding acoustic waves to pass through said AOM so as to form a moving grating; and said input laser pulses are so short in duration relative to the speed of said acoustic waves, that said grating moves an insignificant amount during the laser pulses.

12. A method for shaping laser pulses comprising the steps of:

spatially dispersing frequency components of said pulses;

collimating the frequency components to produce collimated frequency components;

directing the respective collimated frequency components onto a crystal that diffracts portions of the respective collimated frequency components depending on their amplitude and phase;

focussing the collimated frequency components that pass through the crystal; and forming shaped laser pulses from the focussed frequency components.

\* \* \* \* \*